United States Patent [19]

Kraklau et al.

[11] 3,848,337

[45] Nov. 19, 1974

[54] SURFACE INDICATOR

[75] Inventors: David M. Kraklau, St. Joseph; John H. Taylor, Sodus Twp., Berrien County, both of Mich.

[73] Assignee: Advance Products Corporation, Benton Harbor, Mich.

[22] Filed: Dec. 4, 1972

[21] Appl. No.: 311,507

Related U.S. Application Data

[62] Division of Ser. No. 146,052, May 24, 1971, Pat. No. 3,718,977.

[52] U.S. Cl. ............ 33/174 H, 33/169 C, 24/201 B, 269/8
[51] Int. Cl. .............................................. G01b 3/30
[58] Field of Search ......... 33/174 H, DIG. 1, 169 R, 33/169 C; 335/219, 302, 303; 269/8; 24/201 B, 73 MS

[56] References Cited
UNITED STATES PATENTS

| | | | |
|---|---|---|---|
| 2,434,973 | 1/1948 | Williams | 24/201 B |
| 2,589,865 | 3/1952 | Rivard | 33/DIG. 1 |
| 3,120,062 | 2/1964 | Butala | 33/DIG. 1 |
| 3,145,477 | 8/1964 | Morrison | 33/DIG. 1 |

*Primary Examiner*—John W. Huckert
*Assistant Examiner*—Jon W. Henry
*Attorney, Agent, or Firm*—Woodhams, Blanchard and Flynn

[57] ABSTRACT

A method and apparatus for locating the center of a non-circular, such as a rectangular, face of a workpiece to permit the boring or drilling of an opening in the workpiece at the center of said face. The workpiece is adapted to be mounted in a rotatable chuck and locating blocks are firmly held, as by permanent magnets, against diametrically opposite surfaces of the workpiece adjacent said face. The locating blocks have planar reference surfaces which project beyond the said face of the workpiece. An indicating device is mounted near the said face of the workpiece and has a radially outwardly extending contact point disposed to engage the reference surfaces. The workpiece is rotated by the chuck to enable the contact point to engage the reference surfaces, and the workpiece is radially adjusted by the chuck until the reference surfaces are equidistant from the rotational axis.

4 Claims, 5 Drawing Figures

SURFACE INDICATOR

This is a division, of application Ser. No. 146,052, filed May 24, 1971, now U.S. Pat. No. 3,718,977.

FIELD OF THE INVENTION

This invention relates to a method and apparatus for accurately locating the geometric center of one face of a noncircular workpiece, such as a workpiece having a rectangular cross-section, so that said center is concentric with the rotational axis of the chuck on which the workpiece is mounted.

BACKGROUND OF THE INVENTION

In the past, it has been an arduous and time consuming task to axially align the geometric center of a rectangular face on a workpiece with the rotational axis of a chuck on a conventional machine tool, such as a lathe, supporting the workpiece. In most instances, it is necessary to locate the geometric center of the face in order to perform a drilling or boring operation. This operation is most desirably carried out on a conventional machine tool, such as a lathe, whereby the rectangular workpiece is mounted on the lathe chuck directly opposite and in substantial alignment with a cutting or forming tool. As conventional, the lathe chuck and tool are mounted for relative movement toward and away from each other to permit formation of the desired bore in the face of the workpiece.

While the actual formation of the opening is a relatively simple and routine operation, nevertheless the positioning of the workpiece in the lathe chuck so that the geometric center of the front face of the workpiece lies on the rotational axis of the lathe has long presented a problem. At the present time, such rectangular workpieces are, to the best of our knowledge, centered relative to the rotational axis of the chuck by use of an indicator disposed for contacting the radial sides of the workpiece for indicating their radial spacing from the rotational axis. The indicator is normally supported on a cross-slide above the lathe bed and has a contact point spaced radially from and pointing at the rotational axis, which contact point is adapted to engage the sides of the workpiece, adjacent the front face thereof.

The contact point is initially disposed in engagement with one side of the workpiece (as shown in FIG. 1 of the drawings) to indicate the radial spacing of said one side from the rotational axis. The indicator must then be moved axially away from the workpiece so that the workpiece can be rotated approximately 180°. The indicator must then be moved axially toward the workpiece so that it can engage the diametrically opposite side of the workpiece to permit measurement of the radial spacing of said opposite side from the rotational axis. The workpiece is then radially adjusted within the chuck body to partially compensate for eccentricity. This sequence of reciprocating the indicator, rotating the workpiece and adjusting the radial spacing of the opposed side surfaces from the axis, is presently, sequentially repeated many times until the center of the workpiece face is precisely located on the rotational axis of the chuck. This locating sequence must also be carried out with respect to the other two sides of the workpiece, which sides are perpendicular to the first mentioned pair of sides.

While the foregoing operational sequence is correct from a theoretical point of view, nevertheless this positioning operation cannot be performed with the desired degree of preciseness or efficiency. Particularly, since the contact point of the indicator is positioned for engagement with the external side faces of the workpiece, it is necessary for the indicator to be axially moved away from the workpiece before the workpiece can be rotated. Otherwise the contact point would be jammed against the side surface of the workpiece after the desired indication or reading has been made. The axial movement of the indicator away from the workpiece after each measuring or indicating operation is undesirable since such movement of the indicator obviously requires a substantial amount of operator time. Such indicator movement also results in inaccurate measurements.

Particularly, each time the indicator is moved and relocated in engagement with a different side surface of the workpiece, the indicator will be positioned in a slightly different location relative to the rotational axis of the chuck. This thus introduces inaccuracies into the reading of the indicator, and makes radial centering of the workpiece, at best, a trial-and-error proposition. In fact, applicants have observed that attempting to center a workpiece in this manner often requires rotation of the workpiece in excess of twenty turns, with indications or measurements being taken on the diametrically opposite sides of the workpiece during each turn, and with subsequent radial adjustments in the position of the workpiece being made in an attempt to locate the geometric center of the workpiece on the rotational axis. This existing centering operation is, as is readily apparent, highly inefficient and may take as long as 2 hours. Further, even after such a lengthy and inefficient centering operation, the center of the workpiece is often not located with the desired degree of precision.

Accordingly, it is an object of the present invention to provide an improved method and apparatus for quickly centering a rectangular face on a workpiece with respect to the rotational axis of a machine tool, such as a lathe, with a high degree of precision and efficiency, thereby overcoming the above-mentioned existing problems.

It is a further object of the present invention to provide an improved method and apparatus for permitting a workpiece to be quickly and precisely centered without requiring any axial movement of the center indicating device during the centering operation, thereby avoiding the introduction of further errors and/or inaccuracies during the centering operation.

It is also an object of the present invention to provide an improved method and apparatus, as aforesaid, which utilize removable locating blocks having planar reference surfaces disposed for engagement with the side surfaces of the workpiece, which reference surfaces extend forwardly from the front face of the workpiece for engagement with the contact point of an indicator device, thereby enabling the workpiece to be rotated without requiring axial movement of the indicator device out of the rotational path of the workpiece.

Another object of the present invention is to provide a method and an apparatus, as aforesaid, using a locating block which can be easily detachably secured to the side surfaces of the workpiece, as by a permanent magnet, with the locating block having a planar surface which substantially constitutes an extension of the planar side surface of the workpiece and extends outwardly beyond the front face of the workpiece for permitting engagement thereof with the contact point of an indicating device.

A further object of the present invention is to provide a method and an apparatus, as aforesaid, which permit a noncircular workpiece to be rapidly and easily centered with a high degree of precision, as by requiring only a small number of turns (such as four) of the workpiece, and while requiring only a short time period (such as ten minutes) for permitting completion of the centering operation.

These and other objects of the present invention will be apparent to persons acquainted with devices and methods of this type upon reading the following specification and inspecting the accompanying drawings.

Figure 5:
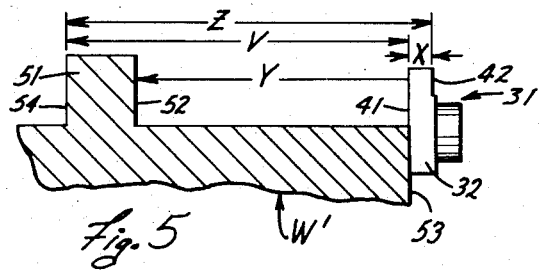
FIG. 5 illustrates an alternate use of the locating device for permitting the accurate measurement of the workpiece dimensions by utilizing either inside or outside calipers.

Certain terminology will be used in the following description for convenience in reference only and will not be limiting. The words "upwardly," "downwardly," "rightwardly" and "leftwardly" will designate directions in the drawings to which reference is made. The words "front" and "rear" will refer to the right and left faces, respectively, of the workpiece as appearing in FIGS. 1 and 2. The words "inwardly" and "outwardly" will refer to directions toward and away from, respectively, the geometric center of the apparatus and designated parts thereof. Said terminology will include the words above specifically mentioned, derivatives thereof and words of similar import.

SUMMARY OF THE INVENTION

The objects and purposes of the invention, including those set forth above, have been met by utilizing special locating devices designed to coact with the workpiece when held within a chuck, such as a lathe chuck. Particularly, a noncircular workpiece, such as a rectangular block, is initially mounted on a chuck having individual jaws which are selectively movable to enable the workpiece to be moved radially relative to the rotational axis of the chuck in the directions of jaw movement. The workpiece is provided with two angularly spaced pairs of substantially parallel side surfaces, the side surfaces of each pair being disposed on substantially dimetrically opposite sides of the rotational axis.

To permit the geometric center of the front face of the workpiece to be positioned on the axis of rotation, the locating devices are first attached to one pair of diametrically opposite side surfaces. The locating devices each have a substantially planar reference surface arranged for engagement with a side surface of the workpiece adjacent its front face, the locating device being held to the workpiece by any suitable means, such as a permanent magnet. The locating devices are disposed such that portions thereof project axially outwardly beyond the front face of the workpiece so that the reference surfaces substantially constitute extensions of the diametrically opposite side surfaces of the workpiece.

An indicating device, which may be mounted upon the cross-slide of a lathe, is disposed so that the contact point of the indicating device is in bearing engagement with the projecting portion of the reference surface of one of the locating devices. Except for slight radial adjustments, the indicator device can be maintained in this position during the entire centering operation. If a dial indicator is used, a reading is taken after contact with the reference surface and an adjustment is made in the chuck, if needed.

The workpiece is then rortated approximately 180° to cause the reference surface of the opposite locating device to be moved into engagement with the contact point of the indicator, whereupon the indicator dial accurately indicates the need for radial adjustment between the rotational axis and the side surface of the workpiece. This sequential measuring and adjusting operation is repeated (usually two or three times) until the indicator readings recorded when the contact point is disposed in engagement with the opposite locating devices are the same. However, since the indicator device remains in a substantially fixed position relative to the chuck at all times, the centering of the first two sides of the workpiece will normally be accomplished in 5 or 10 minutes.

After the workpiece has been centered in one pair of radial directions, the locating devices can be attached to the other pair of side surfaces and the above-mentioned sequence is repeated, whereby the front face of the workpiece is centered in all four directions. However, it may be desirable to recheck the initial two sides after the last two sides have been centered relative to the chuck axis.

The centering operation can be performed with locating devices on all four side surfaces at the same time, if desired. This is particularly advantageous where the front face is square.

Alternately, the workpiece can be centered by a contact point which is not attached to an indicator dial, but it may be necessary to rotate the workpiece a few more times to ensure touching contact on all four sides.

DETAILED DESCRIPTION

Figure 1:
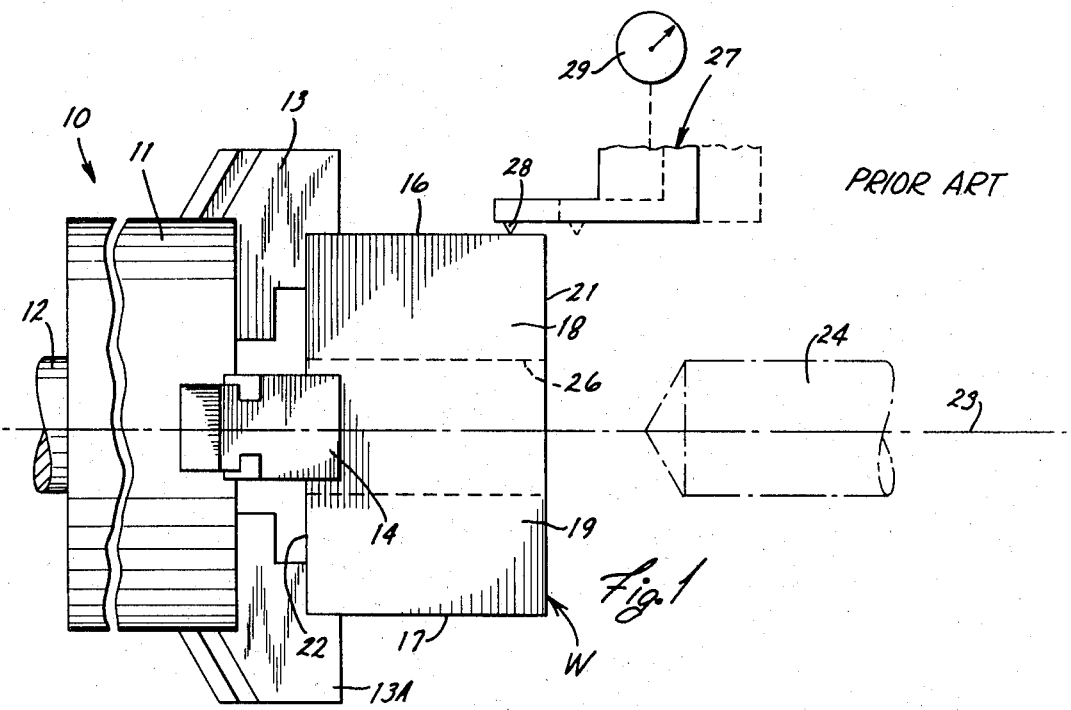
FIG. 1 is a side elevational view of a noncircular workpiece held by a chuck and being centered according to the prior art method of gauging or measuring the position of the workpiece relative to the rotational axis of the chuck.

FIG. 1 illustrates therein a known method and apparatus for locating the center of a face on a noncircular workpiece supported by the chuck of a machine tool. Particularly, there is illustrated a chuck 10, such as the chuck of a lathe, including a conventional chuck body 11 connected to and rotated by a spindle 12, which spindle is rotatably supported on a conventional machine tool frame (not shown) and is rotatably driven by a prime mover (not shown). The chuck body 11 is of conventional construction and includes a plurality of circumferentially spaced, radially adjustable chuck jaws, which are capable of gripping a workpiece in a conventional manner. In the disclosed embodiment, the chuck construction 10 is particularly provided with two pairs of diametrically opposed jaws 13, 13A and 14, 14A, which jaws are movable radially of the chuck body 11 and are disposed for gripping engagement with a noncircular workpiece W. The workpiece W will, in many situations, have a substantially rectangular cross-sectional configuration and thus the workpiece has been so illustrated in the drawings.

The workpiece W comprises a substantially rectangular block having a first pair of opposite and substantially parallel side surfaces 16 and 17 and a second pair of substantially parallel and opposite side surfaces 18 and 19, said latter pair of surfaces 18 and 19 being angularly spaced from the first pair of side surfaces 16 and 17. Since the illustrated workpiece W is of a rectangular configuration, the side surfaces 16 and 17 are perpendicular to the side surfaces 18 and 19. The workpiece W also includes front and rear faces 21 and 22, respectively, which faces are substantially, but not necessarily, parallel and perpendicular to the side surfaces 16, 17, 18 and 19. The front and rear faces 21 and 22, when the workpiece W is held in the chuck 10, are also positioned substantially perpendicular to the rotational axis 23 of the chuck 10.

The lathe or other machine tool also includes a conventional cutting tool 24 (FIG. 1), which is concentric with rotational axis 23 of the chuck 10. The cutting tool 24 and the chuck 10 are, in a conventional manner, mounted for relative movement toward and away from each other to cut a suitable opening or bore 26 into the workpiece W. However, the bore 26 normally must be formed in the workpiece W at a preselected location, such as in concentric relationship to the geometric center C of the front face 21 of the workpiece W. In order to have the bore 26 positioned as desired, this necessarily requires that the center C be disposed on the axis 23 of the chuck. However, due to the noncircular cross-section of the workpiece, positioning the geometric center C directly on the rotational axis 23 has, prior to the present invention, been extremely difficult.

To permit the geometric center C to be moved radially into alignment with the axis 23, it was conventional, at least prior to the present invention, to utilize an indicating device 27 disposed for engagement with the external side surfaces of the workpiece W to measure the radial spacing of the side surfaces from the axis 23 and, in this manner, permit radial adjustment of the workpiece W to eliminate any eccentricity. The indicating device 27 includes a contact point 28 which extends radially inwardly toward the axis 23 and is disposed for engagement with radial side surface of the workpiece W, such as the side surface 16. The indicating device 27 is provided with any suitable means, such as a dial 29, for indicating the radial distance of the workpiece side surface from the axis 23.

After the radial distance of the side surface 16 has been read from the dial 29, then the workpiece W is rotated approximately 180° to permit the radial location of the opposite side surface 17 to be determined. However, since the indicating device 27 is disposed so that the contact point 28 engages an external surface of the workpiece, it is impossible to rotate the workpiece W when the indicating device is disposed in the operative position illustrated by solid lines in FIG. 1. Thus, prior to rotation of the workpiece W, the indicating device 27 must first be axially retracted away from the workpiece, such as to the dotted line position illustrated in FIG. 1. The workpiece W can then be rotated so that the opposite side surface 17 is on top, and the indicating device 27 is moved axially into the operative position illustrated by solid lines in FIG. 1. The contact point 28 will be moved into engagement with the surface 17. The radial distance of the surface 17 from the axis 23 can then be read from the dial 29.

The position of the workpiece can be adjusted relative to the chuck as each side surface is engaged, or the adjustment can be based on differences in the reading of the dial 29 after the contact point 28 has been in engagement with the two surfaces 16 and 17. In either case, the readings are indicative of the radial displacement of the center C from the axis 23, and thus the workpiece W can be radially moved relative to the chuck body 11, as by movement of the chuck jaws 13, to move the center C into concentricity with the axis 23.

The above operational sequence is repeated until the dial readings recorded by contact with the opposite surfaces 16 and 17 are substantially the same. However, due to the axial movement of the indicator device 27 between each measuring step, there will be a slight difference in the location of the contact point 28 from measurement to measurement. This procedure also requires a large number of turns of the workpiece, so that positioning of the center C on the axis becomes a trial-and-error process.

Figure 2:
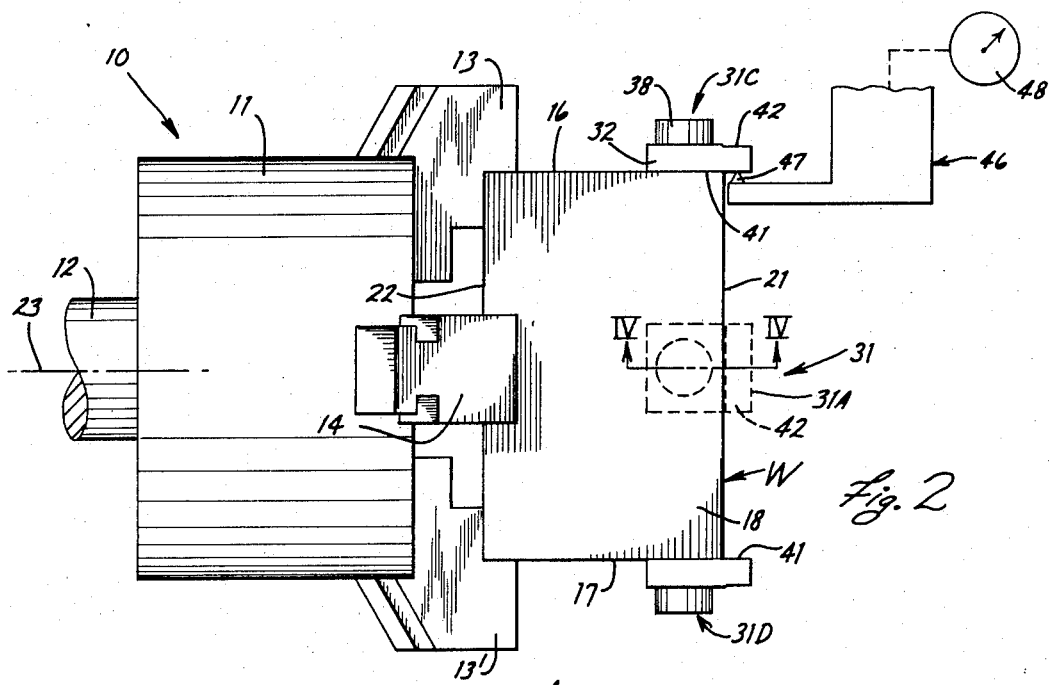
FIG. 2 is a side view similar to FIG. 1 but illustrating the centering of the workpiece according to the method and apparatus of the present invention.
Figure 3:
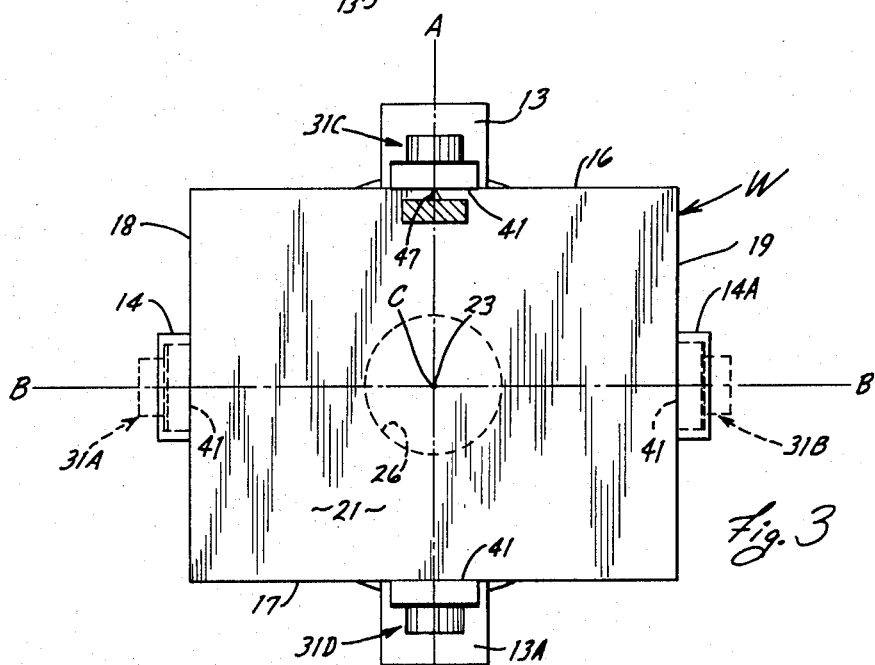
FIG. 3 is a front elevational view substantially as seen from the right side of FIG. 2.
Figure 4:
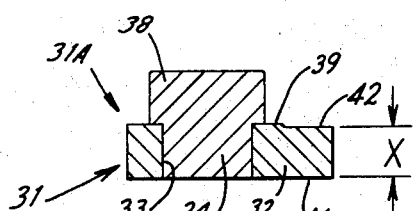
FIG. 4 is a sectional view of the locating device substantially as taken along the line IV—IV of FIG. 2.

The present invention (as illustrated in FIGS. 2–4) utilizes an intermediate locating device 31 which is disposed for coaction between the indicating device and the workpiece. For example identical locating devices 31A and 31B are attached to the pair of surfaces being measured.

The structural details of the locating devices 31A, 31B, 31C and 31D (FIG. 4) are preferably identical. The locating device 31A, for example, includes a rectangular base member 32 having a cylindrical recess 33 therein. A cylindrical permanent magnet 34 is snugly disposed, as by being press-fitted, within the recess 33. An annular gripping member 38 is fixedly, here integrally, secured to the magnet 34 and is disposed against the upper surface 39 of the block 32.

The block 32 and magnet 34 have coplanar, flat, machined bottom faces which define the reference surface 41, which serves as both a seating and a measuring surface. The block 32 may also be provided with a machined surface 42 extending across the upper side thereof adjacent one end of the block. The machined surfaces 41 and 42 are parallel and are spaced a predetermined distance apart, as designated by the letter X.

The locating device 31A is adapted to be disposed in seating engagement with one of the external side surfaces of the workpiece, such as the surface 18 (FIG. 2). The seating surface 41 of the locating device 31A is snugly held against the side surface 19 by the permanent magnet 34. The locating device 31A is positioned such that one end of the block 32, namely that portion of the block having the upper machined surface 42 thereon, projects axially beyond the front face 21 of the workpiece. Thus, the lower surface 41 of the device 31A extends beyond, and substantially constitutes an extension of, the side surface 18 of the workpiece.

After the locating device 31A has been positioned as described above, an identical locating device 31B is disposed in engagement with the opposite side surface 19 and is likewise positioned to extend beyond the front face 21 of the workpiece W.

The locating devices 31A and 31B, when disposed as illustrated in FIG. 2, are adapted to cooperate with an indicating device 46, which is of conventional construction and may be mounted on a cross slide (not shown) of a conventional lathe for movement lengthwise of the axis 23. The indicating device 46 includes a dial 48 for indicating the radial spacing of the contact point 47 from the axis 23. The contact point 47 extends radially outwardly relative to the axis 23 and is positioned forwardly of the front face 21, being disposed to contact the inner reference surface 41 on the extended portion of the locating device 31A.

The workpiece W is initially positioned within and adjusted by the chuck 10 so that contact point 47 engages reference surface 41 of locating device 31A, whereupon the dial 48 indicates the accuracy of the radial spacing of the surface 18 from the axis 23. The workpiece W will then be rotated approximately 180° to cause the contact point 47 to engage the reference surface 41 of the locating device 31B, whereupon the dial 48 will then indicate the radial spacing of the surface 19 from the axis 23. This rotation of the workpiece W can be accomplished without requiring any axial movement of the indicator 46.

If the surfaces 18 and 19 are spaced different radial distances from the axis 23, as indicated by a difference in the dial readings, then the jaws 13 will be adjusted to cause a corresponding radial movement of the workpiece W to move the geometric center C thereof toward the axis 23 in a direction parallel with the plane A—A. A dial reading will again be made on the reference surfaces 41 of the locating devices 31A and 31B. If the dial readings are different, a further radial adjustment in the position of the workpiece will be made and the above-described operational sequence will be repeated until substantially identical dial readings are obtained when the contact point 47 is in engagement with both locating devices 31A and 31B, thereby indicating that the center C is located in the plane B-B containing therein the axis 23.

The locating devices 31C and 31D (or the devices 31A and 31B) are then attached to the other pair of side surfaces 16 and 17 in substantially the same manner as described above with respect to the side surfaces 18 and 19. The workpiece is then rotated so that contact point 47 engages the reference surfaces 41 of the locating devices 31C and 31D, thereby indicating the radial spacing of the surfaces 16 and 17 from the axis 23. If the dial readings are not identical, then the jaws 14 are adjusted to move the workpiece W in a direction parallel with the plane B—B, thereby causing the center C to be moved toward the rotational axis 23. The radial distance of the reference surfaces 41 of the locating devices 31C and 31D are then again measured by the indicating device 46, and further adjustment in the radial position of the workpiece along plane B—B is made until the reference surfaces 41 of the locating devices 31C and 31D are equally spaced from the axis 23. When this has been accomplished, the geometric center C of the front face 21 will be directly aligned with and intersected by the rotational axis 23 of the chuck.

The locating devices 31 can now be removed from the workpiece and the indicator 46 can be moved away from the workpiece. The bore 26 can then be formed in the workpiece by causing the cutting tool 24 and the chuck 10 to be relatively axially moved toward each other while simultaneously rotating the chuck 10 relative to the tool 24.

As readily apparent from the above description, the center C can be rapidly located in alignment with the rotational axis 23 since the indicating device 46 is never moved axially during the centering operation, and thus the position of the indicating device relative to the axis 23 remains constant. Further, since the contact point 47 of the indicating device is positioned forwardly of the front face 21 and is disposed for engagement with radially inwardly directed surfaces, the workpiece W can be freely rotated to cause the various locating devices 31 to be brought into contact with the contact point 47 without requiring any axial movement of the indicating device 46. Thus, not only does this permit the centering operation to be performed very rapidly, but it also permits the workpiece W to be centered very precisely.

While the apparatus and method as described above have related to the use of a substantially rectangular workpiece, it will be readily apparent that the structure of the present invention and the method of using same will be identical if the workpiece possesses some other noncircular cross-section, such as a hexagonal cross-section. In this situation, opposed pairs of surfaces would again be used to position the geometric center of the front face of the workpiece concentric with the rotational axis.

It will also be recognized that, when the workpiece W has a square cross-section, the radial adjustment of the workpiece in directions parallel to the planes A—A and B—B can be performed substantially simultaneously since, in this situation, all of the locating devices are disposed approximately equidistant from the axis 23 and would thus not interfere with the free rotation of the workpiece W relative to the contact point 47.

The locating device 31 constructed according to the present invention can also be used for still a further purpose, namely for permitting the accurate measurement of a predetermined distance on a workpiece. For example, as illustrated in FIG. 5, the workpiece W' is provided with a flange or shoulder 51 thereon, which flange has a front face 52 spaced a predetermined distance Y from the front face 53 of the workpiece W'. The locating device 31 can be disposed so that the reference surface 41 is in seating engagement with the front face 53 and projects outwardly beyond the edge of the workpiece W. In this situation, the reference surface 41 is disposed directly opposite and substantially parallel with the surface 52, thereby permitting the desired distance Y to be accurately and precisely measured in an easy and efficient manner by means of conventional inside calipers.

Further, if it is desired to measure the distance V between the front face 53 of the workpiece W' and the rear face 54 of the flange 51, then the distance can be measured, as illustrated in FIG. 5, by positioning a pair of outside calipers in engagement with the rear surface 54 and the top surface area 42 as formed on the block 32. This will result in a caliper measurement Z, which measurement will then be decreased by the predetermined thickness X of the block 32 for permitting an accurate determination of the distance V between the surfaces 53 and 54.

The locating device 31 thus greatly facilitates the measurement of distances between two substantially parallel, but laterally offset, surfaces by the use of conventional inside or outside calipers.

Alternately, another locating device 31 can be positioned in engagement with surface 54 (FIG. 5), whereupon the distance V can be directly measured between the opposing faces of the locating devices by means of jo blocks and depth rods.

Although a particular preferred embodiment of the invention has been described above in detail for illustrative purposes, it will be recognized that variations and modifications of the disclosed method and apparatus, including the rearrangement of parts, lie within the scope of the present invention.

The embodiments of the invention in which an exclusive property or privilege is claimed are defined as follows:

1. A portable and detachable gauging device adapted for attachment to a ferrous workpiece for accurately determining the distance between two substantially parallel surfaces on said workpiece, said device consisting of an article which is free of relatively moving parts, said article including a body having a smooth planar base surface, said body having a substantially cylindrical recess extending therethrough with the longitudinal axis of said recess being substantially perpendicular to said planar base surface, said recess extending from said base surface through said body to the side of said body opposite said base surface, said body being shaped substantially as a rectangular prism and having substantially perpendicular length and width dimensions which are both perpendicular to said axis, said body also having a thickness dimension extending in a direction substantially parallel to said axis, the width and length dimensions each being substantially greater than the thickness dimension, magnet means including a substantially cylindrical magnet snugly disposed within said recess and fixed relative to said body, said magnet being disposed so as to not project outwardly beyond said base surface, said magnet having on one end thereof a substantially smooth planar axial end surface which is disposed parallel and substantially flush with said base surface, and said magnet means including substantially cylindrical gripping means fixedly connected to and coaxially aligned with said magnet and projecting outwardly from the other end thereof, said gripping means projecting outwardly beyond said other side of said body, said cylindrical gripping means having a diameter which is substantially smaller than each of the length and width dimensions of said body, whereby said gripping means facilitates manual gripping and manipulation of said article.

2. A device according to claim 1, wherein said other side of said body has a smooth and planar surface portion thereon which is parallel to and spaced a predetermined distance from said base surface, said surface portion being spaced outwardly from said cylindrical gripping means.

3. A portable and detachable gauging device adapted for attachment to a ferrous workpiece for accurately determining the distance between two substantially parallel surfaces on said workpiece, said device consisting of an article which is free of relatively moving parts, said article including a rigid body shaped substantially as a rectangular prism and having a smooth and planar substantially rectangular base surface defined by width and length dimensions of said body, said body also having a thickness dimension extending substantially perpendicular to said base surface, said thickness dimension of said body being substantially less than each of said width and length dimensions, said body having a substantially cylindrical recess extending throughout the thickness thereof, the longitudinal axis of said recess extending substantially perpendicular to said base surface, said recess being spaced from the edges of said body, and substantially cylindrical permanent magnet means snugly disposed within said recess and fixedly secured to said body, said magnet means being positioned within said recess so as to not project outwardly beyond said base surface, said magnet means having on one end thereof a smooth and substantially planar axial end surface disposed substantially parallel to said base surface, said cylindrical magnet means extending throughout substantially the complete axial length of said recess.

4. A device according to claim 3, wherein said recess is disposed more closely adjacent one edge of said body than the opposite edge thereof, so that the longitudinal axis of said recess is spaced from the centroid of said base surface.

* * * * *